United States Patent
Brichter et al.

(10) Patent No.: US 10,489,012 B1
(45) Date of Patent: Nov. 26, 2019

(54) USER INTERFACE BASED ON VIEWABLE AREA OF A DISPLAY

(71) Applicant: Twitter, Inc., San Francisco, CA (US)

(72) Inventors: Loren Brichter, San Francisco, CA (US); Leland Rechis, San Francisco, CA (US)

(73) Assignee: TWITTER, INC., San Francisco, CA (US)

(*) Notice: Subject to any disclaimer, the term of this patent is extended or adjusted under 35 U.S.C. 154(b) by 145 days.

(21) Appl. No.: 13/943,412

(22) Filed: Jul. 16, 2013

Related U.S. Application Data

(63) Continuation of application No. 13/711,521, filed on Dec. 11, 2012, now Pat. No. 10,133,439, which is a continuation of application No. 13/598,340, filed on Aug. 29, 2012, now abandoned.

(60) Provisional application No. 61/528,641, filed on Aug. 29, 2011.

(51) Int. Cl.
    G06F 3/048     (2013.01)
    G06F 3/0482    (2013.01)
    G06F 3/0484    (2013.01)
    G06F 3/01      (2006.01)
    G06F 3/0488    (2013.01)

(52) U.S. Cl.
    CPC .......... G06F 3/0482 (2013.01); *G06F 3/017* (2013.01); *G06F 3/0484* (2013.01); *G06F 3/0488* (2013.01); *G06F 3/04842* (2013.01)

(58) Field of Classification Search
    USPC ................. 715/766, 220, 863, 864
    See application file for complete search history.

(56) References Cited

U.S. PATENT DOCUMENTS

| | | | |
|---|---|---|---|
| 8,291,349 B1* | 10/2012 | Park | G06F 3/04883 715/705 |
| 8,631,029 B1* | 1/2014 | Amacker | G06F 17/30554 707/766 |
| 2003/0011641 A1 | 1/2003 | Totman | |
| 2004/0243943 A1 | 12/2004 | Matsumoto | |
| 2005/0028094 A1* | 2/2005 | Allyn | G06F 3/0481 715/273 |
| 2005/0289470 A1 | 12/2005 | Pabla et al. | |
| 2006/0041846 A1 | 2/2006 | Masselle | |
| 2006/0161849 A1* | 7/2006 | Miller et al. | 715/744 |
| 2007/0050731 A1 | 3/2007 | Bennah | |
| 2007/0260999 A1* | 11/2007 | Amadio | G06F 3/0481 715/804 |
| 2008/0062141 A1 | 3/2008 | Chandhri | |
| 2009/0094562 A1 | 4/2009 | Jeong | |
| 2009/0322686 A1 | 12/2009 | Jayasinghe | |

(Continued)

OTHER PUBLICATIONS

Kiaqing Lin et al., A Method of Two-Handed Gesture Interactions with Applications Based on Commodity Devices, Jun. 1, 2011, IEEE Computer Society, pp. 697-702 (Year: 2011).*

(Continued)

*Primary Examiner* — Tam T Tran
(74) *Attorney, Agent, or Firm* — Nixon & Vanderhye, P.C.

(57) ABSTRACT

A method of displaying content in a computing device including a display. The method includes: displaying content on the display; detecting, by the display, a pinch gesture corresponding to an item in the content; displaying, concurrently with the item, a modal window including additional content associated with the item.

20 Claims, 14 Drawing Sheets

(56) References Cited

U.S. PATENT DOCUMENTS

| | | |
|---|---|---|
| 2010/0007613 A1 | 1/2010 | Costa |
| 2010/0194703 A1* | 8/2010 | Fedor et al. .................. 345/173 |
| 2011/0164062 A1* | 7/2011 | Nakamura ......... G01C 21/3664 |
| | | 345/660 |
| 2011/0167387 A1* | 7/2011 | Stallings ............. G06F 3/04883 |
| | | 715/826 |
| 2011/0261030 A1 | 10/2011 | Bullock |
| 2012/0023453 A1 | 1/2012 | Wagner |
| 2012/0068941 A1* | 3/2012 | Arrasvuori et al. .......... 345/173 |
| 2012/0081554 A1* | 4/2012 | Berman ................... H04N 5/91 |
| | | 348/207.1 |
| 2012/0174028 A1 | 7/2012 | Sirpal |
| 2012/0192110 A1* | 7/2012 | Wu .............................. 715/815 |
| 2012/0204125 A1* | 8/2012 | Shia ...................... G06F 3/0488 |
| | | 715/773 |
| 2012/0260293 A1* | 10/2012 | Young et al. ................... 725/52 |
| 2012/0290946 A1 | 11/2012 | Schrock |
| 2013/0125049 A1 | 5/2013 | Dhawan |

OTHER PUBLICATIONS

Rick Kjeldsen et al., Toward the Use of Gesture in Traditional User Interfaces, Jan. 1, 1996, IEEE, pp. 151-156 (Year: 1996).*

* cited by examiner

USER INTERFACE BASED ON VIEWABLE AREA OF A DISPLAY

CROSS-REFERENCE TO RELATED APPLICATIONS

This application is a continuation application of U.S. application Ser. No. 13/711,521, filed on Dec. 11, 2012, which is a continuation of U.S. application Ser. No. 13/598, 340, filed on Aug. 29, 2012, which claims the benefit of U.S. Provisional Patent Application No. 61/528,641, filed on Aug. 29, 2011. The contents of each of these applications are incorporated herein in their entirety.

Copending U.S. patent application Serial No. 13/943,433 and Ser. No. 13/943,385 filed on Jul. 15, 2013, also claim priority to U.S. application Ser. No. 13/711,521. The Ser. No. 13/711,521 application is incorporated by reference herein, in its entirety, for all purposes.

BACKGROUND

The present invention relates to portable devices and, more particularly, to graphical user interfaces for touch-sensitive portable devices.

Many of today's computers and devices include a graphical user interface ("GUI") through which a user can interact with the computer or device. A GUI can include various user interface elements, such as windows, scroll bars, buttons, pull-down menus, and so on. Most GUIs for computers use the concept of a desktop with windows in arbitrary user defined positions on the display screen. Since the desktop can get cluttered with windows, such GUIs also utilize the concept of modal windows where user attention and interaction can be focused. As recent devices such as tablet computers have started to use touch-sensitive displays, the notion of multiple windows manipulated and arranged by a user on a desktop becomes awkward. Most current GUIs for touch-sensitive displays use single window application interfaces, with an occasional modal dialog, in order to make user interaction manageable.

SUMMARY

A graphical user interface for a device with a touchscreen display is disclosed.

In one or more embodiments of the invention, a panel in a stack of overlapping panels slides into a viewable area of the touchscreen display when a gesture, such as a swipe gesture, is detected. The other panels viewable in the display area rearrange so as to optimize the user's view of the panel and related panels. A new panel can be added to the stack of overlapping panels by making a selection on an existing panel in the stack. Alternatively, the selection on the existing panel causes content in another existing panel in the stack to be updated and possibly resized to fit the new content. The swipe gesture can be along an orientation that matches the orientation of the sliding of the panels and can be used to rapidly switch between panels.

In one or more embodiments of the invention, even when a panel is overlapped by another panel in the stack, it is still possible to interact with the partly visible panel. An interaction with the overlapped panel in the stack can advantageously cause one or more of the other panels in the stack to slide away to reveal the overlapped panel. Embodiments of the invention provide a user interface for a device with a touchscreen display that provides the organizational flexibility of conventional GUI windows while avoiding the awkwardness and complexity of managing multiple windows using a touch-screen.

In one or more embodiments of the invention, gestures are used to display information associated with an item in a list. A multi-finger drag gesture, for example, can be used to create a pull-down view of items associated with the selected item, which is particularly advantageous for displaying a threaded conversation of messages associated with a selected message. In one or more embodiments of the invention, a modal window of information associated with the selected item is displayed in response to a pinch gesture. In one or more embodiments of the invention, the viewable area's contents can be shifted so as to reveal a non-modal underlay view which can be interacted with by the user while still interacting with the contents of the viewable area. The non-modal underlay view can advantageously be an input view that allows a user to enter text while still interacting with the rest of the user interface.

Other aspects of the invention will be apparent from the accompanying drawings, description, and appended claims.

DETAILED DESCRIPTION

Figure 1:
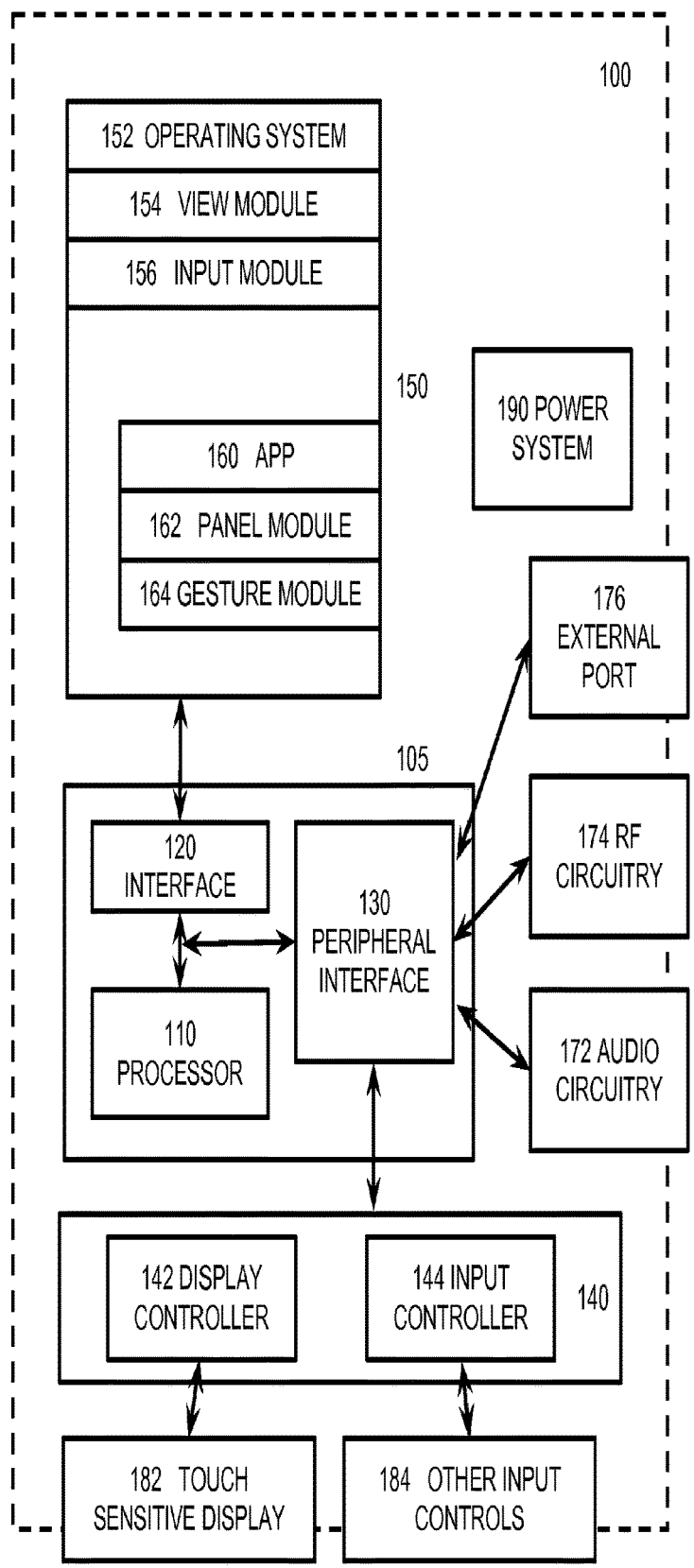
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for displaying content in a computing device having a display. Initially, content is shown on the display. A pinch gesture corresponding to an item in the content is detected. A modal window including additional content associated with the item is then displayed concurrently with the item.

FIG. 1 is a block diagram illustrating a portable device 100 with a touch-sensitive display 182, in accordance with various embodiments of the invention. The device 100 may include one or more processing units (CPUs) 110, a memory interface 120, a peripherals interface 130, an input/output (I/O) subsystem 140, and memory 150 (which may include one more computer readable storage mediums). The components may communicate over one or more communication buses or signal lines. The peripherals interface 130 couples the input and output peripherals of the device to the CPU 110 and memory 150. The one or more processors 110 run or execute various software programs and/or sets of instructions stored in memory 150 to perform various functions for the device 100 and to process data. In one or more embodiments of the invention, the peripherals interface 130, the CPU 110, and the memory interface 120 may be implemented on a single chip, such as a chip 105. In one or more embodiments of the invention, they may be implemented on separate chips. The device 100 also includes a power system 190 for powering the various components. Various components of the device 100 may be implemented on separate devices connected by a network (e.g. the Internet), with wired and/or wireless segments. Those skilled in the art will appreciate that there may be more than one of each separate component running on the device 100, as well as any combination of these components within a given embodiment of the invention.

It should be appreciated that the device 100 is only one example of a portable device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

The device 100 may include peripherals such as audio circuitry 172, RF circuitry 174, and an external port 176. The audio circuitry 172 provide an audio interface between a user and the device 100 using known techniques for converting electrical signals to audio data. The RF (radio frequency) circuitry 174 receives and sends RF signals (also called electromagnetic signals) and converts electrical signals to/from electromagnetic signals. The RF circuitry 174 is used to communicate with communications networks and other communications devices via the electromagnetic signals. The RF circuitry 174 may include well known circuitry for performing these functions, including but not limited to an antenna system, an RF transceiver, one or more amplifiers, a tuner, one or more oscillators, a digital signal processor, a codec chipset, a subscriber identity module (SIM) card, memory, and so forth. The device 100 may include other peripherals, such as sensors, e.g., optical sensors, proximity sensors, etc.

The I/O subsystem 140 couples input/output peripherals on the device 100, such as the touch-sensitive display 182 and other input/control devices 184, to the peripherals interface 130. The I/O subsystem 140 may include a display controller 142 and one or more input controllers 144 for other input or control devices. The one or more input controllers 144 receive/send electrical signals from/to other input or control devices 184. The other input/control devices 184 may include physical buttons (e.g., push buttons, rocker buttons, etc.), dials, slider switches, joysticks, click wheels, and so forth. In one or more embodiments of the invention, input controller(s) 144 may be coupled to any (or none) of the following: a keyboard, infrared port, USB port, and a pointer device such as a mouse.

The touch-sensitive display 182, also referred to as a "touchscreen", provides an input interface and an output interface between the device 100 and a user. The display controller 142 receives and/or sends electrical signals from/ to the touchscreen 182. The touchscreen 182 displays visual output to the user. The visual output may include graphics, text, icons, video, and any combination thereof (collectively termed "graphics"). In one or more embodiments of the invention, some or all of the visual output may correspond to user-interface objects, further details of which are described below. The touchscreen 182 may use LCD (liquid crystal display) technology, or LPD (light emitting polymer display) technology, although other display technologies may be used, in accordance with various embodiments of the invention. The touchscreen 182 has a touch-sensitive surface, sensor or set of sensors that accepts input from the user based on haptic and/or tactile contact. The touchscreen 182 and the display controller 142 (along with any associated modules and/or sets of instructions in memory 150) detect contact (and any movement or breaking of the contact) on the touchscreen 182 and converts the detected contact into interaction with user-interface objects (e.g., one or more soft keys, icons, web pages or images) that are displayed on the touchscreen. In an exemplary embodiment, a point of contact between a touchscreen 182 and the user corresponds to a finger of the user. The touchscreen 182 and the display controller 142 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touchscreen 182. The user may make contact with the touchscreen 112 using any suitable object or appendage, such as a stylus, a finger, and so forth. In one or more embodiments of the invention, the user interface is designed to work primarily with finger-based contacts and gestures, which are much less precise than stylus-based input due to the larger area of contact of a finger on the touchscreen. In one or more embodiments of the invention, the device translates the rough finger-based input into a precise pointer/cursor position or command for performing the actions desired by the user.

Memory 150 may include high-speed random access memory and may also include non-volatile memory, such as one or more magnetic disk storage devices, flash memory devices, or other non-volatile solid-state memory devices. Access to memory 150 by other components of the device 100, such as the CPU 120 and the peripherals interface 130, may be controlled by the memory interface 120. In one or more embodiments of the invention, the software components stored in memory 150 include an operating system 152 and/or subcomponents such as a view module 154 (or set of instructions), an input module 156 (or set of instructions), and/or one or more applications 160 (or set of instructions). The operating system 152 (e.g., LINUX, UNIX, OS X, Darwin, RTXC, WINDOWS, or an embedded operating system such as VxWorks) includes various software components and/or drivers for controlling and managing general system tasks (e.g., memory management, storage device control, power management, etc.) and facilitates communication between various hardware and software components. Each of the modules and applications correspond to a set of instructions for performing one or more functions described herein. These modules (i.e., sets of instructions) need not be implemented as separate software programs, procedures or modules, and thus various subsets of these modules may be combined or otherwise re-arranged in various embodiments. In one or more embodiments of the invention, memory 150 may store a subset of the modules and data structures identified above. Furthermore, memory 150 may store additional modules and data structures not described above.

The view module 154 includes various known software components for rendering and displaying graphics on the touchscreen 182. As used herein, the term "graphics" includes any object that can be displayed to a user, including without limitation windows, panels, text, web pages, icons (such as user-interface objects including soft keys), digital images, videos, animations and the like. An animation in this context is a display of a sequence of images that gives the appearance of movement, and informs the user of an action that has been performed (such as moving an email message to a folder). In this context, a respective animation that confirms an action by the user of the device typically takes a predefined, finite amount of time, typically between 0.2 and 1.0 seconds, and generally less than two seconds.

The input module 156 provides software components for handling input events, including input events from the touchscreen 182 and the other input controls 184. The input module 156 can be used to detect contact with the touchscreen 182 (in conjunction with the display controller 142). The input module 156 can include various software components for performing various operations related to detection of contact, such as determining if contact has occurred, determining if there is movement of the contact and tracking the movement across the touchscreen 182, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts).

The device 100 supports one more applications 160. The application can be any of a number of types of applications, including messaging applications such as e-mail applications, instant messaging applications, blogging applications, as well as web browsing applications, multimedia applications, etc. The various applications that may be executed on the device may use at least one common physical user-interface device, such as the touchscreen. One or more functions of the touchscreen as well as corresponding information displayed on the device may be adjusted and/or varied from one application to the next and/or within a respective application. In this way, a common physical architecture (such as the touchscreen) of the device may support the variety of applications with user interfaces that are intuitive and transparent. In one or more embodiments of the invention, the application 160 includes software components for handling management of panels 162 and for handling specific user interface related gestures 164. As discussed above, although these components are depicted in FIG. 1 as integrated with the application 160 and as separate components, these components can be integrated in other ways including as part of the underlying operating system 152 and also as functions of the same component(s).

Figure 2:
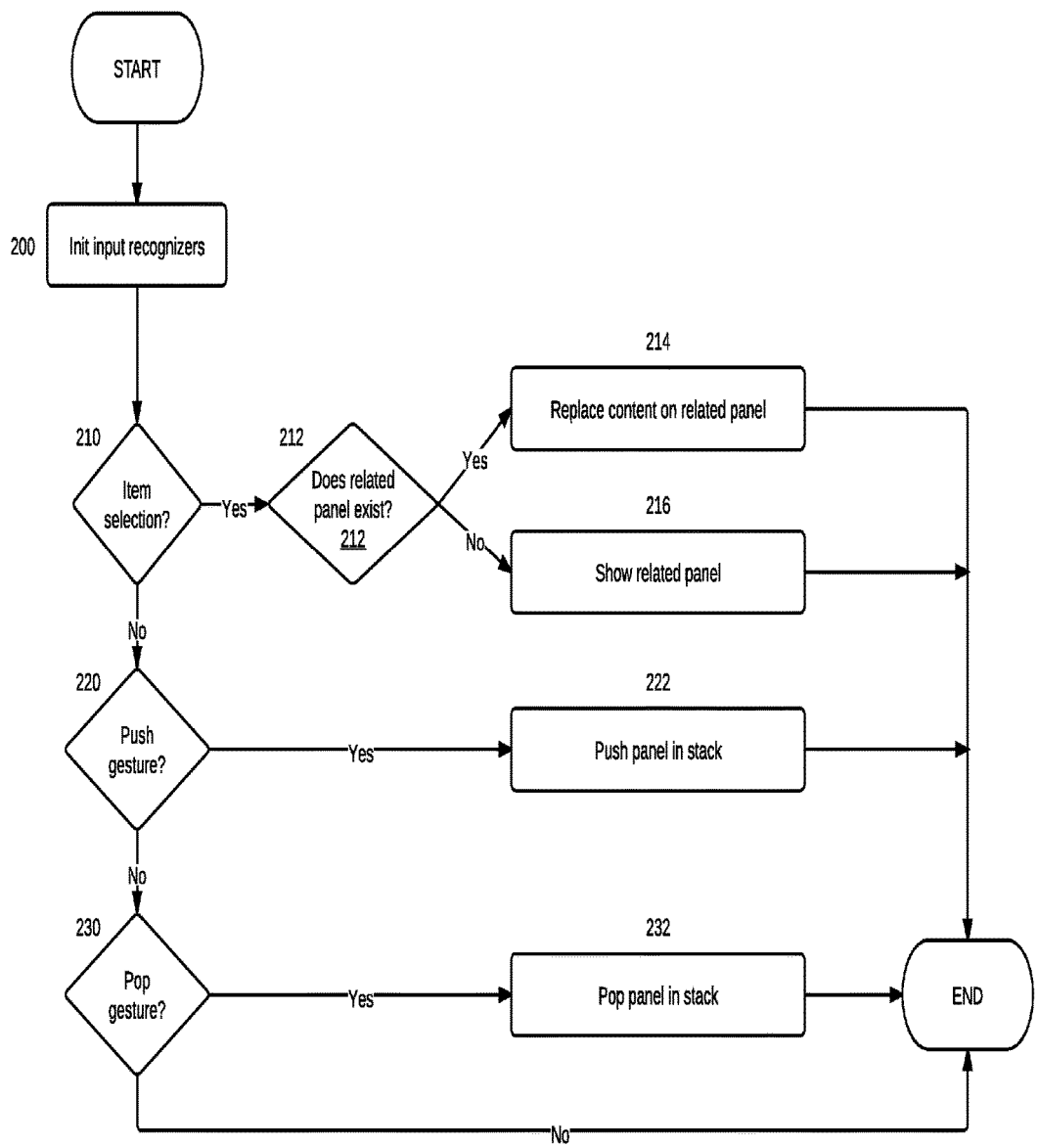
FIG. 2 shows a flowchart of processing performed by the gesture module in accordance with one or more embodiments of the invention.

FIG. 2 shows a flowchart of a method for displaying content in a user interface. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 2 should not be construed as limiting the scope of the invention.

In one or more embodiments of the invention, one or more of the steps of the method of FIG. 2 are performed by the gesture module 164 and/or the panel module 162 of FIG. 1. The gesture module may communicate with the underlying input module of an operating system so as to allow the device to respond to different user input from the touchscreen. At step 200, one or more software components responsible for handing the particular user inputs described herein and enabling a response, referred to without limitation as input recognizers, are initialized. In one or more embodiments of the invention, the input recognizer(s) are implemented as a component of the gesture module. Alternatively, the input recognizers may be implemented as a separate component of the application 160, or any other component of the portable device 100, in accordance with various embodiments of the invention. The particulars of the initialization process may be different depending on the operating system. At step 210, the input recognizer receives a touch event indicating that the user made a selection that, in the context of the application, might typically entail the initialization of a new window in a conventional user interface. For example and without limitation, the user could have selected an item from a list of messages and, by selecting the item, has indicated an intention to see more information regarding the message. Alternatively, the user could have selected a link in content presented by the application and, by selecting the link, has indicated an intention to see the content at the link. As further described below, rather than opening a separate window (or replacing the existing window with the new content), the gesture module may be configured use the panel module to generate and display overlapping panels.

In one or more embodiments of the invention, the gesture module includes application logic for creation, deletion, modification, and/or display of one or more panels in a stack. The gesture module may be configured to interpret various types of user input (described below with regard to FIGS. 2-14) and to request panel changes from the panel module in response to that input. The gesture module may further be configured to perform any other user interface modifications described with regard to FIGS. 2-14 (below) in conjunction with one or more other components of the device and in accordance with various embodiments of the invention.

In one or more embodiments of the invention, the panel module includes functionality to generate, modify, and/or display a stack of one or more panels. The panel module may be configured to provide panel-related functionality to one or more requesting entities (e.g., other components of the portable device, such as the application, the gesture module, and the view module). Thus, the panel-related functionality described below with regard to FIGS. 2-14 may be performed by the panel module, in accordance with various embodiments of the invention.

At step 212, a determination is made (e.g., by the panel module) as to whether an existing related panel has already been initialized for the display. If it has, then, at step 214, the content in the existing panel is replaced (e.g., by the panel module). If not, then, at step 216, a new panel is displayed on the screen and content associated with the selection is displayed in the related panel (e.g., by the panel module). The selection of step 210 may be any user interface interaction including, but not limited to, a tap, a drag, a swipe gesture, a multi-touch gesture, and a pinch gesture, in accordance with various embodiments of the invention. In one or more embodiments of the invention, the gesture module is configured to detect and interpret the selection of step 210, and to respond accordingly.

Figure 3:
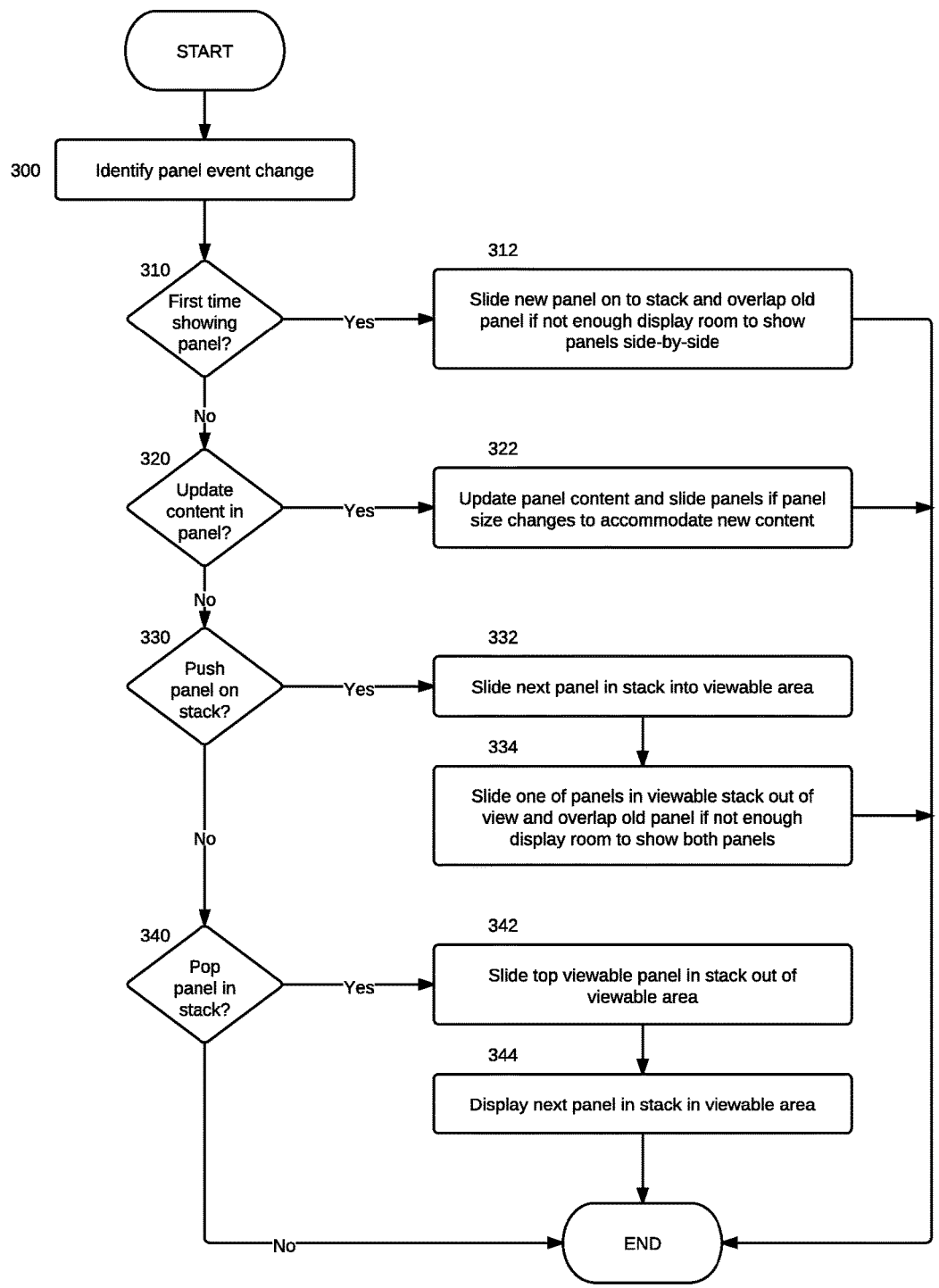
FIG. 3 shows a flowchart of processing performed by the panel module in accordance with one or more embodiments of the invention.

FIG. 3 shows a flowchart of a method for displaying content in a user interface. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 3 should not be construed as limiting the scope of the invention.

In one or more embodiments of the invention, one or more of the steps of the method of FIG. 2 are performed by the gesture module 164 and the panel module 162 of FIG. 1. The panel module may be configured to communicate with the gesture module and with the underlying view module so as to specify the user interface behavior of the panels in response to different user input. At step 300, the panel module receives an indication that a user input event has caused a change to the display of the user interface. The particulars of how the panel module received the indication, whether by message passing or event handlers or function call or some other mechanism, will differ depending on the operating system. At step 310, the panel module receives an indication to create a new panel, for example, as provided at step 216 in FIG. 2. At step 312, the new panel is pushed on the stack. In one or more embodiments of the invention, the new panel is animated to slide from a side of the display and/or may partially or entirely overlap one or more existing content or panels. The panel could slide from any side of the display, although in the exemplary user interface figures included herein, the panels are illustrated as sliding from the right side of the screen. In one or more embodiments of the invention, the appearance of the new panel on the touchscreen causes one or more existing panels in the viewable area of the display to be pushed partially or entirely out of the viewable area in order to display the new panel and/or to optimize the user's view of the content in the panels. For example, if the display is not large enough to show the panels side-by-side, the new panel will at least partially overlap the existing panel in a manner so as to allow the user to see and interact with a portion of the content of the existing panel.

At step 320, the panel module determines whether the panel change event requires an update to the content in an existing panel, for example, as provided at step 214 in FIG. 2. At step 322, the panel is refreshed with the new content. In one or more embodiments of the invention, the size of the panel can be adapted to accommodate the new content. For example, where the new content entails a wider piece of content, e.g., a full web page rather than a message, the panel can be enlarged so as to optimize the user's view of the content in the panel. In one or more embodiments of the invention, a change in size of the panel could entail shifting and/or further overlapping existing panels, as described above and below. Various different panel operations are described in further detail below with reference to FIGS. 4-7, in accordance with various embodiments of the invention.

In one or more embodiments of the invention, the panel module includes functionality to create and maintain a stack of panels as part of the user interface, and to add newly created panels to the stack. With reference again to FIG. 2, the gesture module in conjunction with the panel module, may be configured to provide an advantageous mechanism for navigating through the panels of the user interface. At steps 220 and 230, the input recognizer receives a touch event indicating that the user has made a gesture on the touchscreen. In one or more embodiments of the invention, the gesture module is configured to identify a direction of the gesture (e.g., a direction of a swipe gesture). The gesture module may then, depending on the direction, request the panel module to push a panel in the stack at step 222 or pop a panel in the stack at step 232.

In one or more embodiments of the invention, the gesture module includes functionality to push a panel in the stack of overlapping panels in response to a swipe gesture and to pop a panel from the stack in response to a swipe gesture in another direction (e.g., the opposite direction). For purposes of this disclosure, "pushing" a panel in the stack may refer to one or more of the following:

a. Creating a new panel and adding it to a location in the stack (e.g., the top of the stack)

b. Moving an existing panel to a higher location in the stack c. Increasing the presence of an existing panel in the viewable area of the display (with or without changing its location in the stack). For example, a panel may be shifted inwards in the viewable area in order to reveal a portion of the panel residing outside of the viewable area. This may also require overlapping and/or shifting one or more other panels lower and/or higher in the stack.

For purposes of this disclosure, "popping" a panel in the stack may refer to one or more of the following:

a. Removing a panel from the stack b. Moving an existing panel to a lower location in the stack c. Decreasing the presence of an existing panel in the viewable area of the display (with or without changing its location in the stack). For example, a panel may be shifted towards an edge of the viewable area in order to reveal a portion of one or more overlapped panels residing lower in the stack.

The swipe gestures can be in any advantageously defined direction on the touchscreen, although they are preferably in opposite directions and/or in the same axis of orientation from which the panels slide. With reference again to FIG. 3, the panel module receives an indication to push a panel in the stack at step 330. At step 332, the panel module will slide the appropriate panel in the stack into the viewable area of the display. In one or more embodiments of the invention, each "push" swipe gesture causes the next highest panel in the stack to move (e.g., from being partially or entirely off screen) into a viewable area of the display. Thus, the next highest panel may be more prominently displayed as a result of the push (although in one or more embodiments of the invention, the panel may still be partially overlapped and/or off screen after the push). In one or more embodiments of the invention, if the next panel is off-screen or partly off-screen, the panel module animates sliding the panel into the display, as described above. At step 334, the other panels in the viewable area of the display will arrange so as to provide the focus to this panel in the stack. In one or more embodiments of the invention, this may entail shifting other panels, partially or entirely overlapping other viewable panels lower in the stack, and/or removing a panel from the viewable area so as to not clutter the display. At step 340, the panel module receives an indication to pop a panel in the stack. At step 342, the currently viewable panel is animated to slide so as to reveal (partially or entirely) the next panel in the stack. If there is enough room on the display, the popped panel may be made to appear partly on-screen and partly-off screen. If not, the popped panel can be moved completely off-screen but kept in the stack of panels stored in memory. At step 344, the remaining panels in the viewable area are arranged so as to provide the focus on the panel underneath the popped panel in the stack. In one or more embodiments of the invention, this may entail shifting other panels, partially or entirely overlapping other viewable panels lower in the stack, and/or adding a panel into the viewable area from lower in the stack.

In one or more embodiments of the invention, the panel module includes functionality to define and/or identify one or more snap locations. A snap location is a location in the viewable area of the display which may be associated with a snap proximity value. The snap proximity value is a maximum distance (e.g., in pixels, percentage of screen width/height, or other measurement) from which panels may be snapped to the snap location. Thus, in one or more embodiments of the invention, if a user drags a panel within the snap proximity of a snap location, the panel will be snapped to the snap location (e.g., upon release of the panel or immediately upon entering the snap proximity). Releasing the panel may involve releasing contact with the touchscreen display in order to complete a drag gesture. Any other method of user input may be used, in accordance with various embodiments of the invention. Examples of a snapping location may include, but are not limited to, a horizontal edge of the viewable area, a vertical edge of the viewable area, an edge or point of another panel in the stack, a column (e.g., of messages), a message in a list of messages, an edge of a window or view, a point associated with a user interface element, and any other definable point in the viewable area of the display. For example, a left side edge of the viewable area may be defined as a snap location. In this example, if a panel is released within a distance of 5% of the screen width of the left side edge, the panel is snapped to the edge. In one or more embodiments of the invention, any point or edge of the panel may designated for snapping to one or more snap locations. Thus, in the aforementioned example, the panel may be snapped to the edge at a mid-point (or any other predefined point) so that only a portion of the panel remains in the viewable area of the display. In this example, the portion of the panel remaining in the viewable area may provide an identifier or a summary of content within the panel.

In one or more embodiments of the invention, the panel module includes functionality to define and/or identify a snap velocity associated with one or more snap locations. The snap velocity may be used to determine, either with or without a snap proximity value, whether or not to snap a panel to a snap location in response to user input (e.g., a drag gesture involving a panel). Thus, if a velocity of a gesture exceeds the snap velocity, a user interface element (e.g., a panel) may be snapped to the snap location. Any number of additional criteria may be used in conjunction with the snap velocity. In one example, the criteria may require that the gesture be in the direction of the snap location. In this example, if a user drags a panel toward a snap location at a velocity exceeding the snap velocity, the panel is snapped to the snap location. In another example, a combination of snap velocity and snap proximity are used. In this example, the faster the velocity of the gesture, the farther the permitted proximity from the snap location. A mathematical formula may be used to determine whether or not the combination of velocity and proximity is sufficient to perform a snap to the snap location. For example, the mathematical formula may be Score=V/P, where V is the gesture velocity and P is the distance from the gesture release to the snap location. In this example, if the calculated score (i.e., the output of the mathematical formula) exceeds a predefined minimum score value, the snap may be performed. Any variant of this example formula may be used, in accordance with various embodiments of the invention. The snapping functionality may be implemented by the panel module in conjunction with the view module of the operating system, and/or any other component of the system in accordance with various embodiments of the invention.

Figure 4:
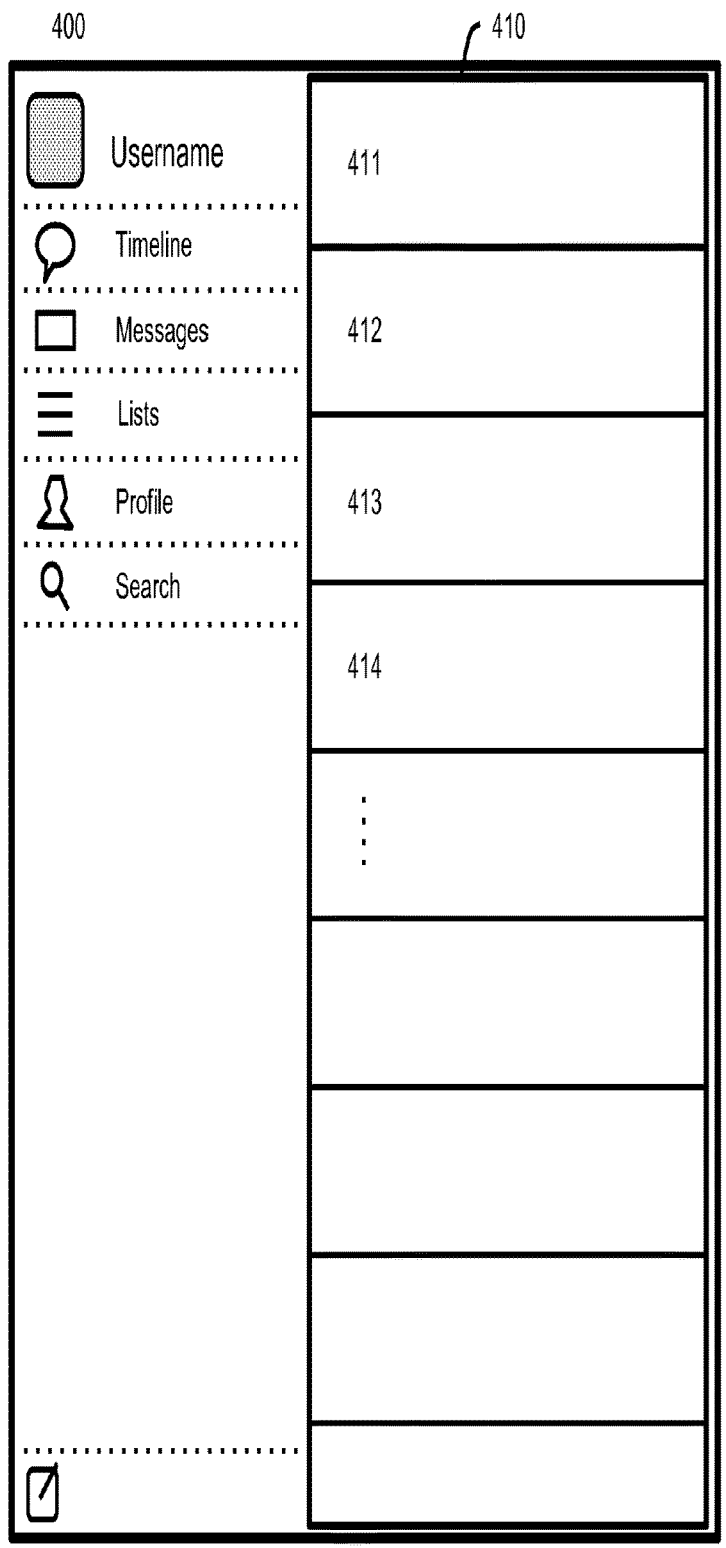
FIGS. 4-7 show various examples of user interfaces in accordance with one or more embodiments of the invention.

FIGS. 4-7 illustrate exemplary user interfaces in accordance with various embodiments of the invention. FIG. 4 illustrates an example of a user interface for an application, which for illustration purposes only, is a messaging application. The user interface comprises a viewable area of the display 400 with an initial panel 410 that displays content. In FIG. 4, the panel 410 displays messages 411, 412, 413, 414, etc. The panel 410 of messages can configured to respond to conventional navigational gestures, e.g., by scrolling up or down in response to a drag or a swipe gesture. To the left of the panel are different user interface elements that can be selected by touching the elements.

Figure 5:
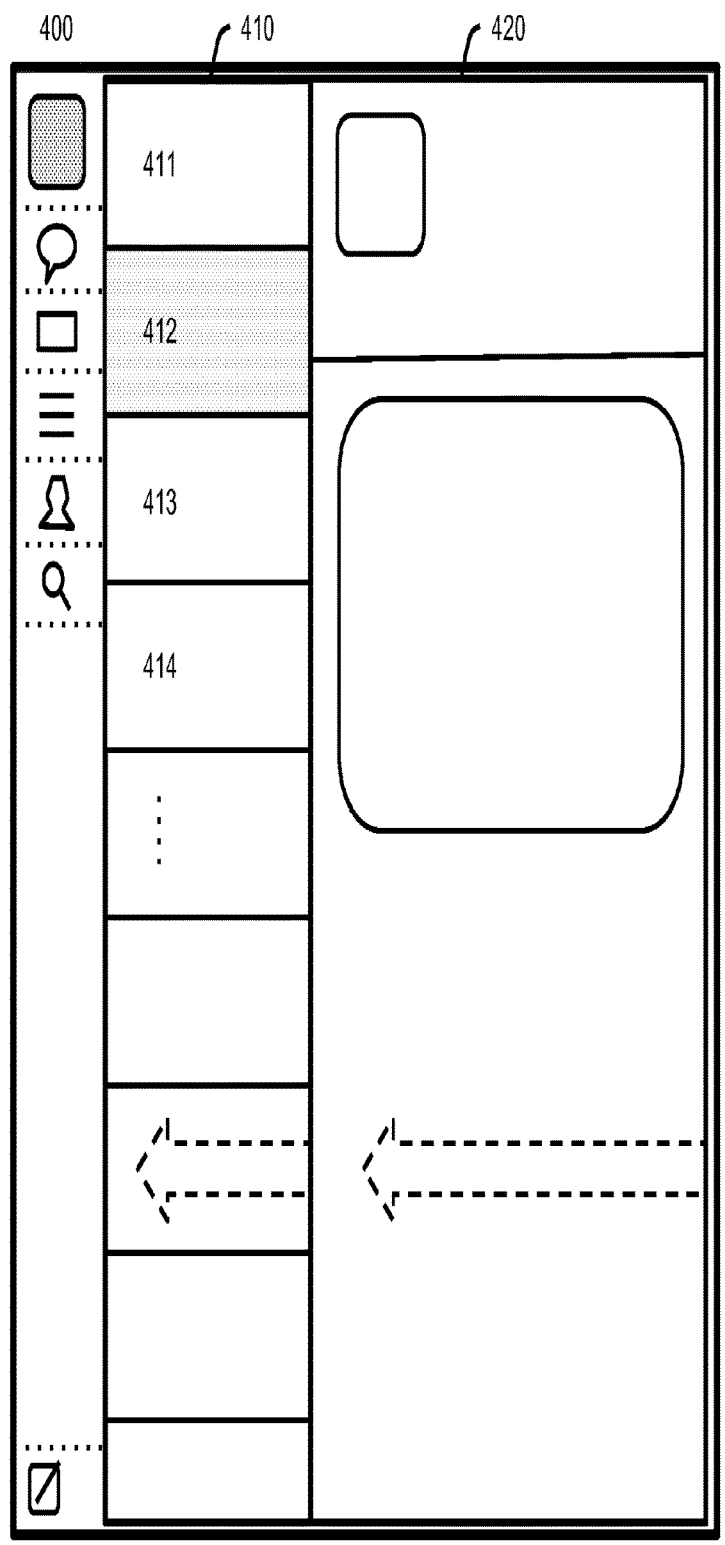

FIG. 5 illustrates an exemplary user interface in which one of the messages (e.g., message 412 of FIG. 4) or a link in the content of one of the messages is selected by the user (e.g., by touching the message or the link). As depicted in the example of FIG. 5, a new panel 420 slides into the viewable area 400 and becomes the focus of attention in the viewable area 400. In this example, in order to allow some of the underlying panel 410 in the stack to remain viewable, panel 410 slides as depicted in FIG. 4. Notably, in one or more embodiments of the invention, the selected message 412 can be highlighted to depict the association between the selected message 412 and the new panel 420. Since the user can still view the underlying panel 410, the user can select a different message in the message list. This may cause panel 420 to be updated with content associated with the different selection. Depending on the nature of the content, in this example, this can also cause panel 420 to change its size to fit the new type of content. For example, if the new content is wider, panel 420 can enlarge to overlap more of panel 410. The user can also still interact with the underlying panel 410 (although certain interactions may be configured to cause focus to return to the panel 410).

Figure 6:
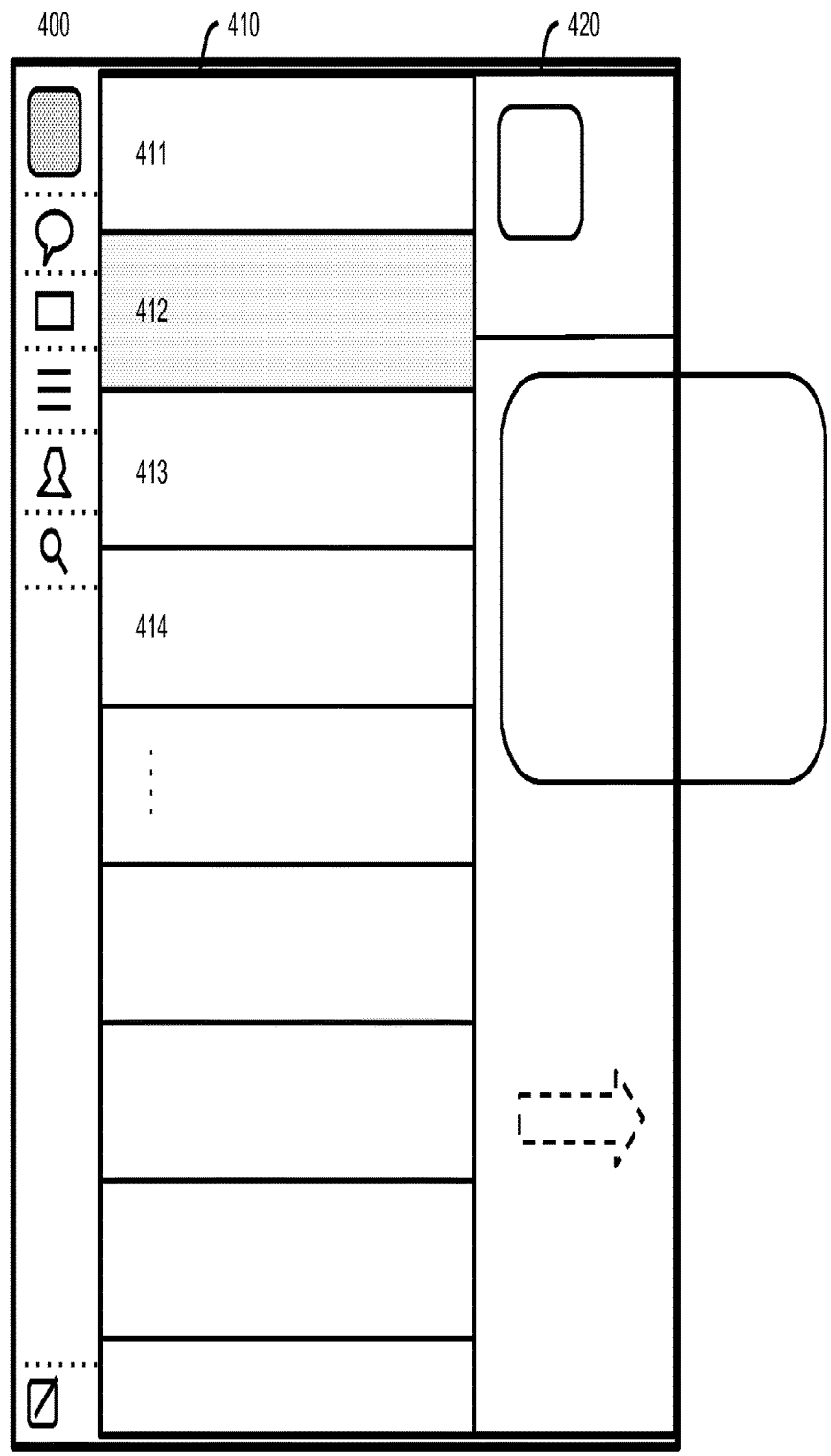

FIG. 6 illustrates an exemplary user interface depicting a swipe gesture being used to pop a panel from the stack of panels depicted in FIG. 5. In this example, the user swipes the touchscreen towards the right. This causes panel 420 to slide towards the right and off-screen. Continuing the example, since there is still room in the viewable area 400 to show panel 420 and still show all of the underlying panel 410 in the stack, panel 420 is moved to be displayed partly on-screen and partly off-screen. The focus of attention has shifted back to panel 410 in the stack. In this example, if the user swipes the touchscreen toward the left, this swipe gesture will push a panel in the stack of panels. Panel 420, which is partly off-screen in the example of FIG. 6, will slide back on-screen and overlap panel 410 so as to look again like the user interface depicted in FIG. 5. If, on the other hand, a selection is made in panel 420, a new panel may be created to slide in from the side and added to the stack of panels. In this example, this would cause panel 420 to shift and further overlap panel 410.

In one or more embodiments of the invention, the gesture module includes functionality to detect a user input corresponding to an overlapped panel. In response, the gesture module may use the panel module to move one or more overlapping panels in order to display some or all of the overlapped panel. In one or more embodiments of the invention, a panel is brought into view (e.g., by popping one or more overlapping panels) in response to a vertical swipe gesture (e.g., an upward swipe or a downward swipe). In the example of FIG. 6, a vertical swipe in the area of panel 410 may result in the motion depicted by panel 420 (e.g., a slide to the right of the display) to reveal a hidden portion of panel 410.

In one or more embodiments of the invention, depending on the dimensions of the viewable area 400 in relation to optimal touch targets in the viewable area 400, it may be advantageous to limit the number of viewable panels from the stack in the viewable area 400 to a certain number. For example, if the panel module limited the number of viewable panels to two in FIG. 6, then, in the above example, panel 420 would shift and completely obscure panel 410 so as to make room for viewing the new panel and part of panel 420. In one or more embodiments of the invention, the user interface may optionally provide some visual clue as whether there are panels either underlying the viewable panels in the stack or off-screen higher in the stack. For example, the user interface could draw lines representing each panel stacked under the viewable panels, much like the pages in a book.

Figure 7:
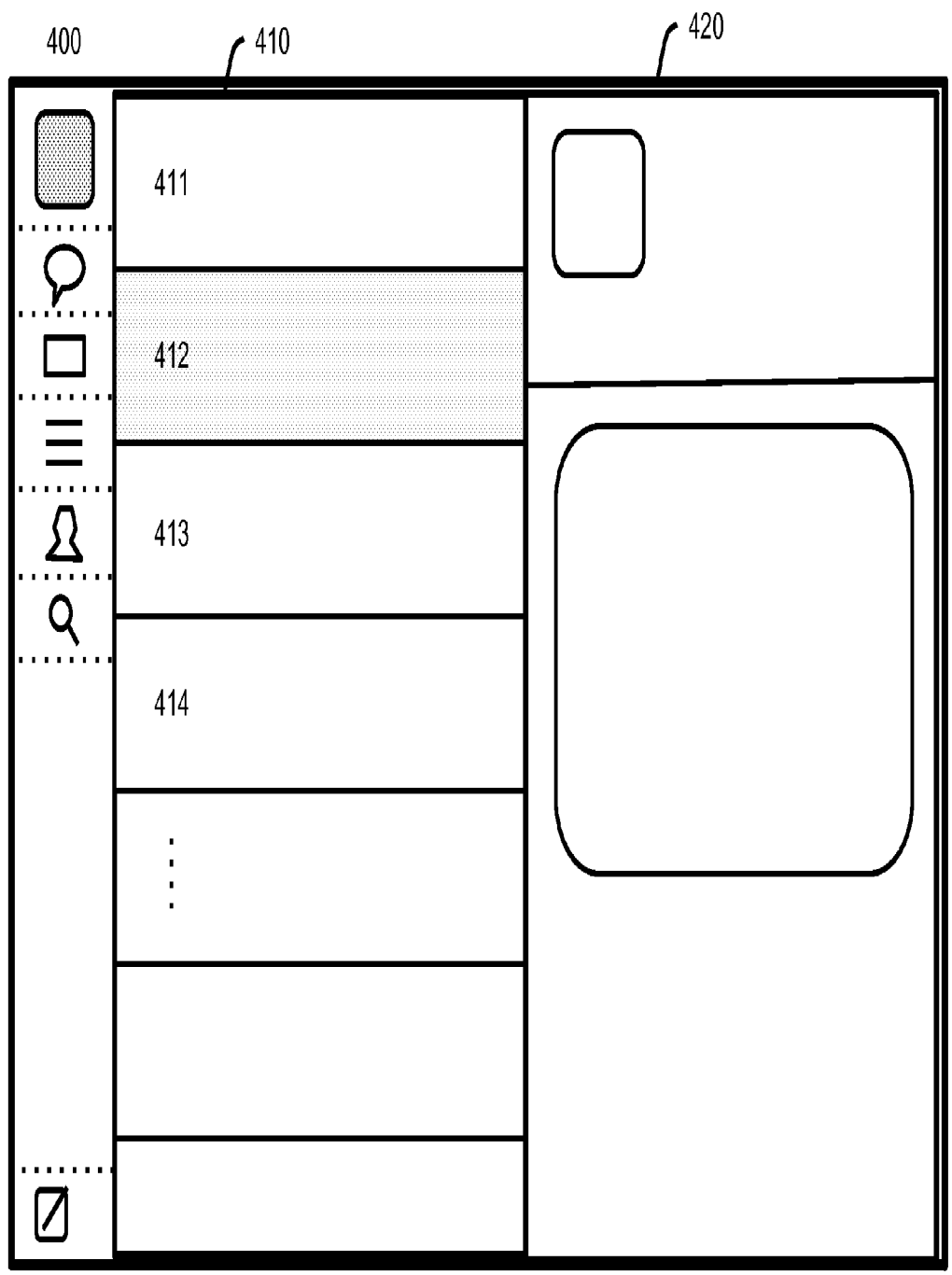

FIG. 7 shows an example of a user interface adapting to a different shape viewable area 400, for example, when the device's orientation changes. In this example, since the width of the viewable area 400 in FIG. 7 can accommodate the full width of both panels 410 and 420, the panels can be displayed side-by-side. Thus, as new panels are created, a new panel can replace panel 420 and panel 420 can replace panel 410 (or can slide and overlap panel 410). Similarly, in one or more embodiments of the invention, as the user swipes through the stack of panels, the panels can similarly be moved on the screen.

Figure 8:
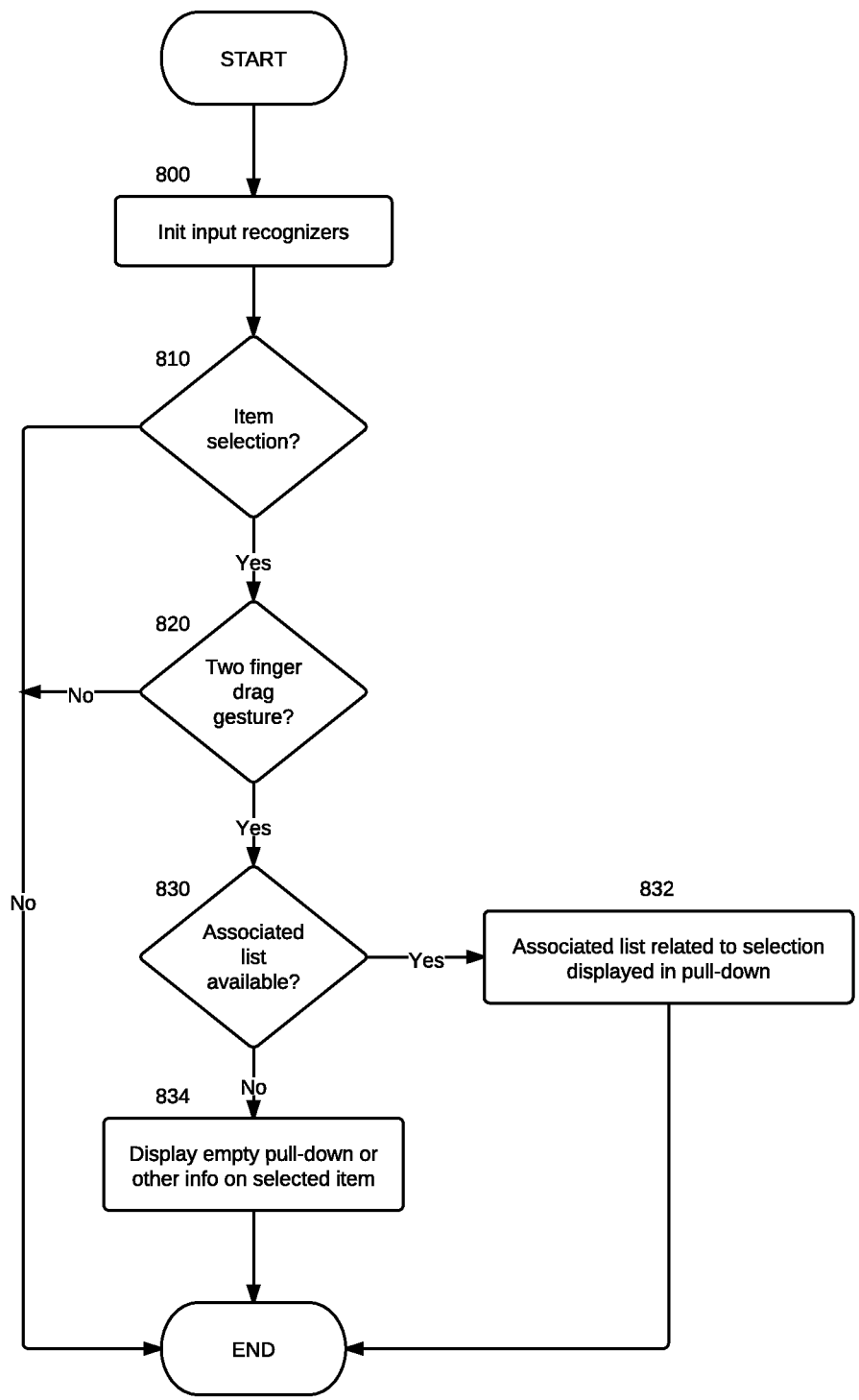
FIG. 8 shows a flowchart of processing performed by the gesture module in accordance with one or more embodiments of the invention.

FIG. 8 shows a flowchart of a method for displaying content in a user interface. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 8 should not be construed as limiting the scope of the invention.

In one or more embodiments of the invention, one or more of the steps of the method of FIG. 8 are performed by a gesture module (e.g., gesture module 164 of FIG. 1, discussed above). As mentioned above, the gesture module may be configured to communicate with the underlying input module of the operating system so as to allow the device to respond to different user input from the touchscreen. At step 800, the input recognizers responsible for handling the particular user inputs described herein and enabling a response are initialized. At step 810, the input recognizer receives a touch event directed at a particular item (e.g., in a list of items) displayed in the user interface. For example, with reference to the illustrative user interface shown in FIG. 4, the input recognizer can be associated with the view object representing panel 410 and identify that an item selected, for example, the message 412. At step 820 in FIG. 8, the input recognizer determines whether a particular gesture (e.g., a two-finger drag gesture) has been performed. If the gesture has been performed by the user, the process proceeds to step 830. In step 830, it is determined whether the selected item is associated with a list of items. If the list of items is available, then, at step 832, the associated list is displayed in a pull-down view. In step 834, if a list of associated items is not identified, then, the pull down view is rendered empty (or can display some other related information to the selected item). This may be a particularly useful user interface element for items such as messages. Messages can often be grouped into conversations where the messages are directed in reply to one another. An example of this, in the context of email, is what is often referred to as a "threaded" presentation of email, where the email is grouped into threads of replies and forwards. The gesture module may be configured to provide a quick way of displaying the conversation of messages related to the selected message without resorting to a separate new panel view of the selected message.

Figure 9:
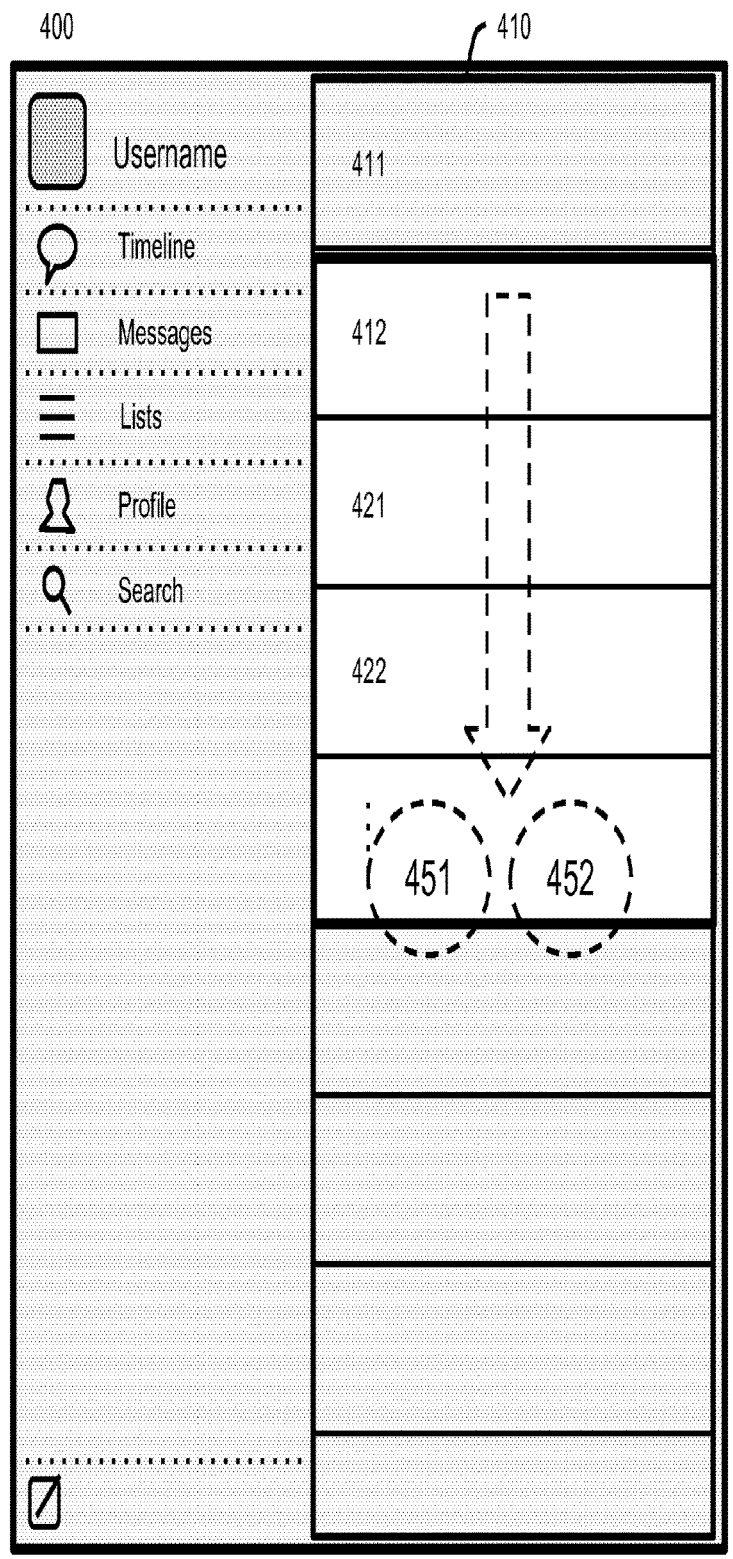
FIG. 9 shows an examples of a user interface corresponding to the processing performed in FIG. 8 in accordance with one or more embodiments of the invention.

FIG. 9 illustrates an exemplary user interface incorporating one or more of the embodiments depicted by FIG. 8. In the example of FIG. 9, the user has selected the message 412 in panel 410 by touching two fingers 451 452 to the message 412 element and dragging downwards. In this example, this causes the related messages 421 and 422 to appear in a pull-down view at least partially overlapping panel 410.

Figure 10:
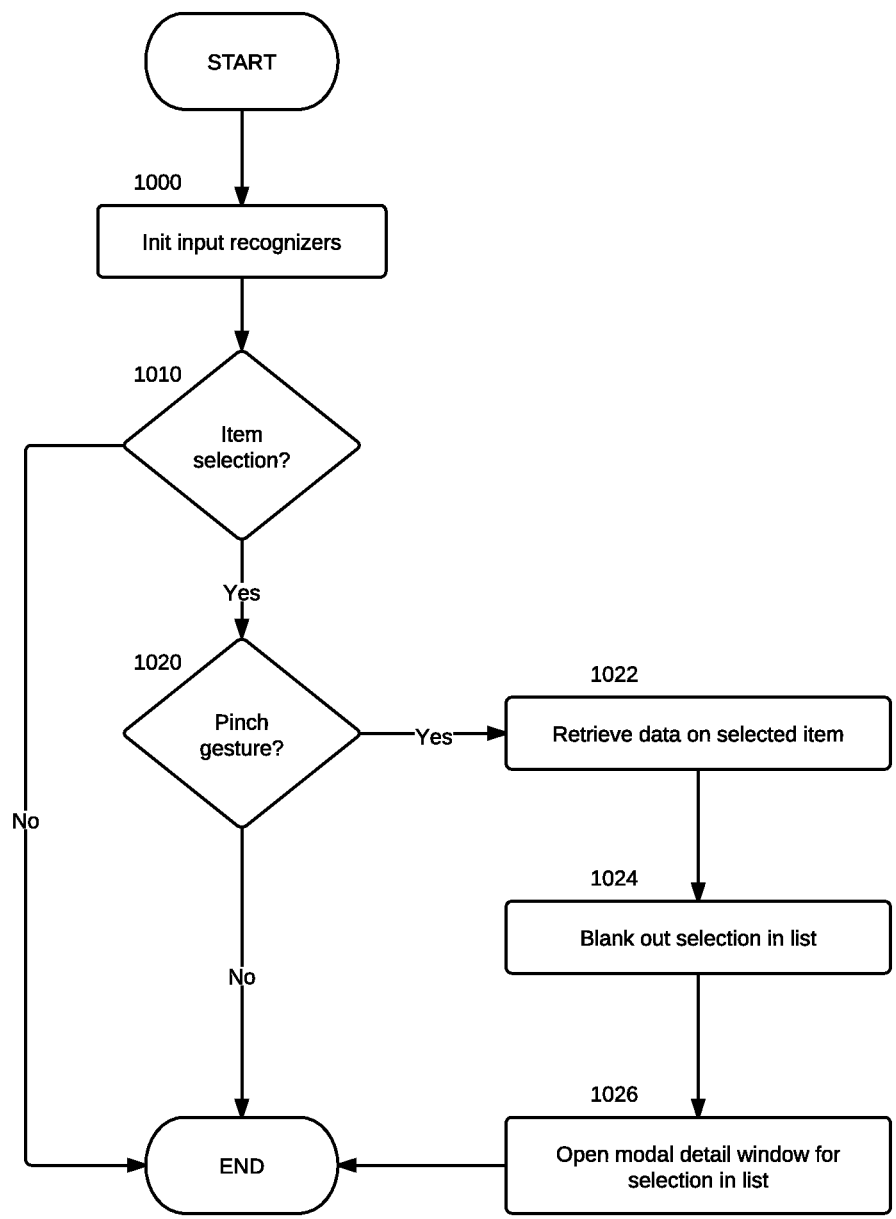
FIG. 10 shows a flowchart of processing performed by the gesture module in accordance with one or more embodiments of the invention.

FIG. 10 shows a flowchart of a method for displaying content in a user interface. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 10 should not be construed as limiting the scope of the invention.

In one or more embodiments of the invention, one or more of the steps of the method of FIG. 10 are performed by a gesture module (e.g., gesture module 164 of FIG. 1, discussed above). As mentioned above, the gesture module may be configured to communicate with the underlying input module of the operating system so as to allow the device to respond to different user input from the touchscreen. At step 1000, the input recognizers responsible for handling the particular user inputs described herein and enabling a response are initialized. At step 1010, the input recognizer receives a touch event directed at a particular item in a list displayed in the user interface. For example, with reference to the example user interface shown in FIG. 4, the input recognizer can be associated with the view object representing panel 410 and identify that an item (e.g., the message 412) is selected. At step 1020 of FIG. 10, the input recognizer determines whether a particular gesture has been performed (e.g., an outward pinch gesture). If the gesture module determines that the gesture has been performed, in step 1022, information associated with the selected item is retrieved. In step 1024, a visual indicator that the item selected is displayed, for example, by creating an empty highlighted list item. Then, in step 1026, a modal detail window is displayed. In one or more embodiments of the invention, the modal window is animated as if it emanated from the list item into the modal detail window. As indicated previously, in one or more embodiments of the invention, one or more of steps 1000-1026 are performed by the gesture module.

Figure 11:
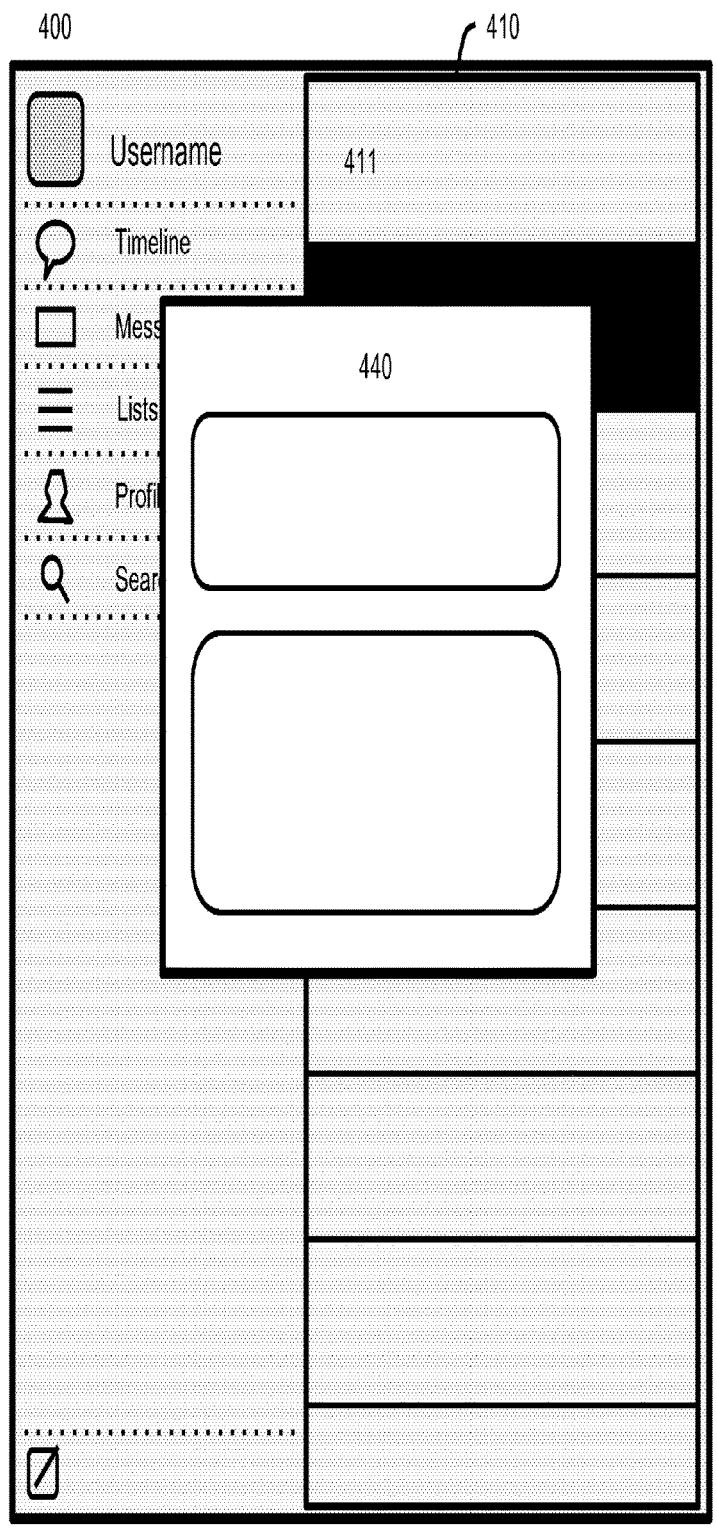
FIG. 11 shows an examples of a user interface corresponding to the processing performed in FIG. 10 in accordance with one or more embodiments of the invention.

FIG. 11 illustrates an exemplary user interface incorporating one or more of the embodiments depicted by FIG. 10. In FIG. 11, the user interface depicted in FIG. 4 is shown where the user has selected the message 412 in panel 410 by touching two or more fingers to the selected message and pinching (e.g., an outward pinch). As depicted in FIG. 11, in one or more embodiments of the invention, this causes the selected item to animate and/or appear to move forward and turn into a modal window 440 including additional details and information on the selected item 412.

Figure 12:
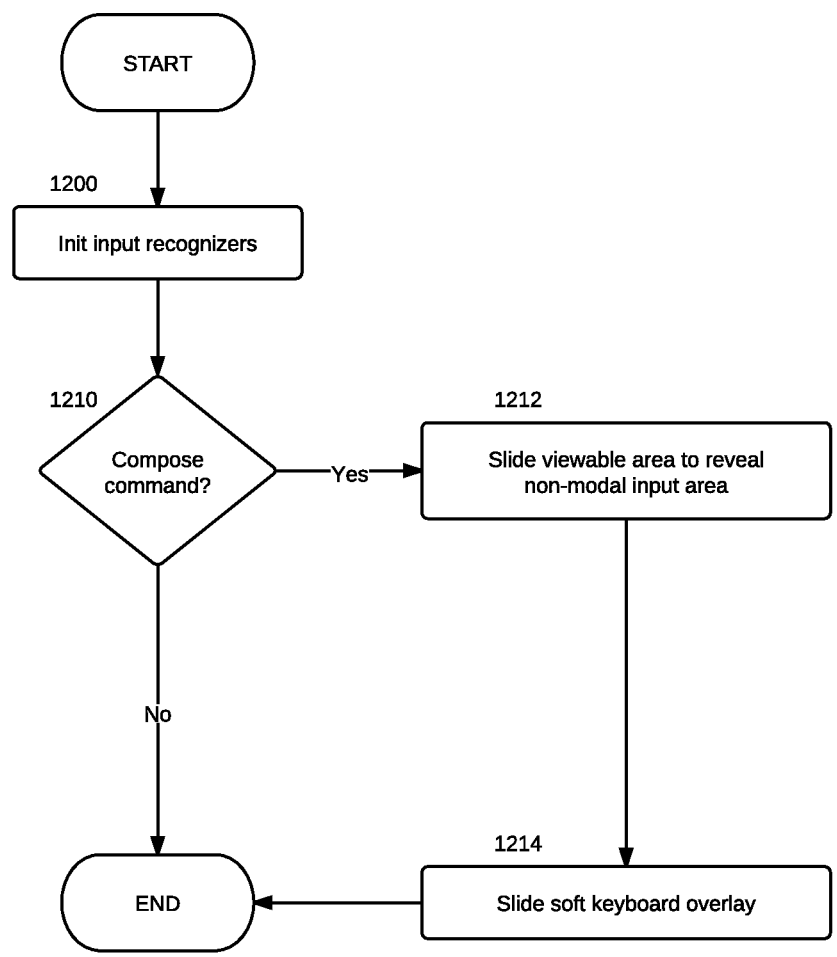
FIG. 12 shows a flowchart in accordance with one or more embodiments of the invention.

FIG. 12 shows a flowchart of a method for displaying content in a user interface. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 12 should not be construed as limiting the scope of the invention.

In one or more embodiments of the invention, one or more of the steps of the method of FIG. 12 are performed by a gesture module (e.g., gesture module 164 of FIG. 1, discussed above). As mentioned above, the gesture module may be configured to communicate with the underlying input module of the operating system so as to allow the device to respond to different user input from the touchscreen. In step 1200, the input recognizers responsible for handling the particular user inputs described herein and enabling a response are initialized. In step 1210, in one or more embodiments of the invention, the input recognizer receives a touch event directed at a soft button meant to indicate that the user intends to enter text, for example, as a new message. It should be noted that although the example of FIG. 12 is directed toward embodiments that uses a soft button on a touchscreen, an alternative selection mechanism such as a physical button can also be used. At step 1212, the viewable area of the user interface slides away to reveal an input area. In one or more embodiments of the invention, the area is advantageously non-modal. Thus, the user may still be able to interact with the portion of the user interface in the viewable area that is still viewable while interacting with the input area. At step 1214, in one or more embodiments of the invention, the gesture module causes a soft keyboard overlay slide out, where needed.

Figure 13:
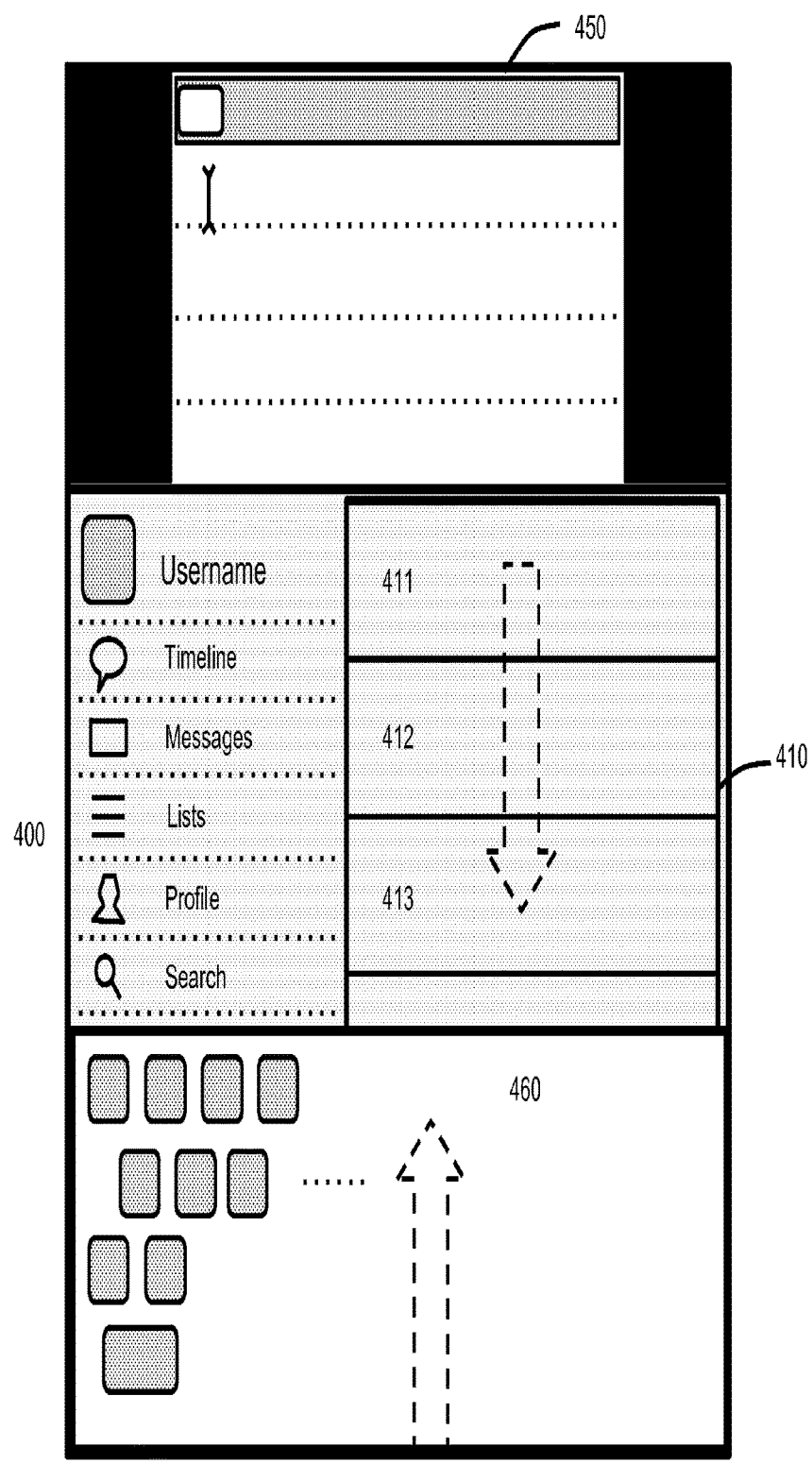
FIG. 13 shows an examples of a user interface corresponding to the processing performed in FIG. 12 in accordance with one or more embodiments of the invention.

FIG. 13 illustrates an exemplary user interface incorporating one or more embodiments depicted by the example of FIG. 12. The user is assumed to have interacted with the user interface of FIG. 4 and selected a "compose" feature, e.g., a soft button in the lower left hand corner of the user interface. In this example, the result is depicted in FIG. 13. In one or more embodiments of the invention, the viewable area 400 of the user interface, including panel 410, shifts downwards. This reveals an underlay view 450 which, in the example of FIG. 13, is an input view which allows a user to enter text. In FIG. 13, a soft keyboard overlay 460 also slides upward to allow the user to type and enter text. The user interface in FIG. 13 advantageously allows the user to continue to interact with the user interface in the original viewable area 400 including the panel 410 of messages 411, 412, 413, etc.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Well known methods, procedures, components, circuits, and networks have not been described in detail so as not to unnecessarily obscure aspects of the embodiments.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Figure 14:
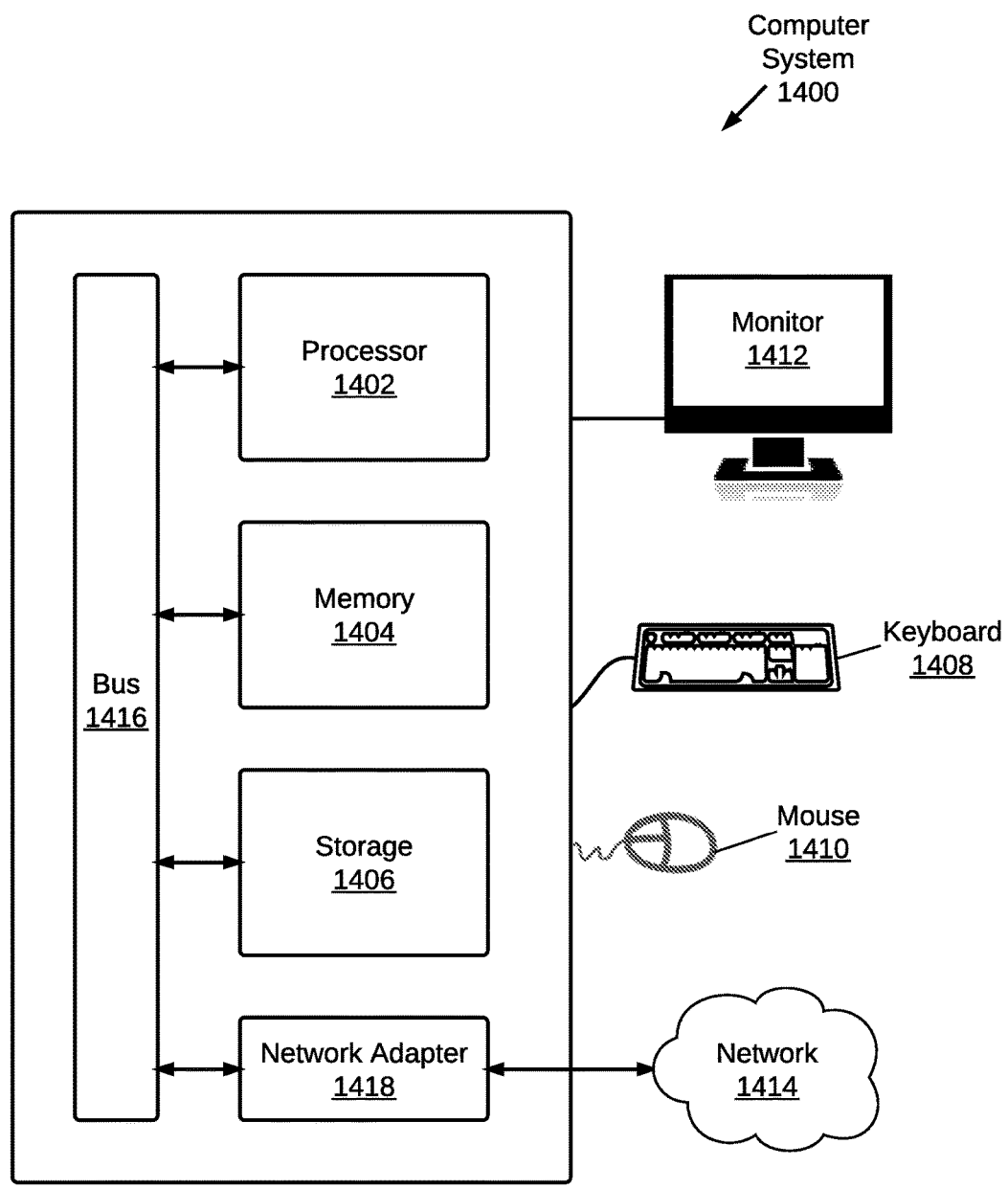
FIG. 14 shows a computer system in accordance with one or more embodiments of the invention.

Embodiments of a portable device, user interfaces for such devices, and associated processes for using such devices are described. In one or more embodiments of the invention, the device is a portable device such as a mobile tablet computer or a mobile telephone that also contains other functions, such as PDA and/or music player functions. For simplicity, in the discussion that follows, a portable device that includes a touchscreen is used as an exemplary embodiment. It should be understood, however, that some of the user interfaces and associated processes may be applied to other devices, such as personal computers and laptop computers, which may include one or more other physical user-interface devices, such as a physical click wheel, a mouse and/or a joystick. FIG. 14 (described below) depicts an example of such a device.

Multiple embodiments have been described, and it will be understood that the above illustrative discussions are not intended to be exhaustive or to limit the inventions to the embodiments described. Various modifications can be made without departing from the spirit and scope of the invention. The embodiments were chosen and described in order to best explain the principles of the invention and its practical applications, to thereby enable others skilled in the art to best utilize the invention and various embodiments with various modifications as are suited to the particular use contemplated. Accordingly, other embodiments are within the scope of the following claims.

Embodiments of the invention may be implemented on virtually any type of computer regardless of the platform being used. For example, as shown in FIG. 14, a computer system 1400 includes one or more processor(s) 1402 (such as a central processing unit (CPU), integrated circuit, hardware processor, etc.), associated memory 1404 (e.g., RAM, cache memory, flash memory, etc.), a storage device 1406 (e.g., a hard disk, an optical drive such as a compact disk drive or digital video disk (DVD) drive, a flash memory stick, etc.), a network adapter 1418, and numerous other elements and functionalities typical of today's computers (not shown). One or more components of the computer system 1400 may be communicatively connected by a bus 1416. The computer system 1400 may also include input means, such as a keyboard 1408, a mouse 1410, or a microphone (not shown). Further, the computer system 1400 may include output means, such as a monitor 1412 (e.g., a liquid crystal display (LCD), a plasma display, or cathode ray tube (CRT) monitor). The computer system 1400 may be connected to a network 1414 (e.g., a local area network (LAN), a wide area network (WAN) such as the Internet, or any other type of network) via the network adapter 1418. Those skilled in the art will appreciate that many different types of computer systems exist, and the aforementioned input and output means may take other forms. Generally speaking, the computer system 1400 includes at least the minimal processing, input, and/or output means necessary to practice embodiments of the invention.

Further, in one or more embodiments of the invention, one or more elements of the aforementioned computer system 1400 may be located at a remote location and connected to the other elements over a network. Further, embodiments of the invention may be implemented on a distributed system having a plurality of nodes, where each portion of the invention (e.g., panel module 162, gesture module 164, input module 156, view module 154, etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By providing a modal and non-modal views and windows in response to user input, it may be possible to increase usability of an application and to streamline user interaction with the application. Specifically, by recognizing gestures on a touchscreen display, it may be possible to reduce the completion time of one or more common tasks.

Furthermore, the disclosed user interface systems and methods may facilitate efficient organization of information in an application while also facilitating rapid navigation on a touch-sensitive device and coordination between panels of information. Applications which in a conventional GUI would use multiple windows could use the overlapping panels when their user interfaces are ported to a touch-sensitive device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A display method for a computing device including a touchscreen display, the method comprising:
    displaying, on the touchscreen display, one or more panels separately slidable from a viewable area of the touchscreen display to outside the viewable area of the touchscreen display, a first one of the panels including a list of messages;
    based on detecting, via the touchscreen display, input of a first type for a first one of the messages, displaying, on the touchscreen display, a modal window which is animated to originate at a location of the first message and comprises first information associated with the first message;
    based on detecting, via the touchscreen display, input of a second type for the first message, different from the first type, displaying on the touchscreen display, a pull-down view comprising second information associated with the first message; and
    based on detecting, via the touchscreen display, input of a third type for the first message, different from the first and second types, sliding, into the viewable area of the touchscreen display, a second one of the panels comprising third information associated with the first message.

2. The method of claim 1, wherein the input of the first type comprises an outward pinch gesture.

3. The method of claim 1, wherein the list of messages is partially overlapped by the modal window.

4. The method of claim 1, wherein the input of the first type comprises a pinch gesture.

5. The method of claim 1, wherein the input of the second type comprises a drag gesture.

6. The method of claim 1, wherein the input of the third type comprises a touch input to the first message.

7. The method of claim 1, wherein the second information comprises a message thread including the first message.

8. A method for displaying content on a touchscreen display of a computing device, the method comprising:
    displaying, on the touchscreen display, one or more panels separately slidable from a viewable area of the touchscreen display to outside the viewable area of the touchscreen display, a first one of the panels including a list of messages; and
    based on detecting, via the touchscreen display, input of a first type for a first one of the messages,
        identifying, by the computing device, first information associated with the first message; and
        displaying, on the touchscreen display, a modal window which is animated to originate at a location of the first message in the list of messages and comprises the first information;
    based on detecting, via the touchscreen display, input of a second type for the first message, different from the first type,
        identifying, by the computing device, second information associated with the first message; and
        displaying, on the touchscreen display, a pull-down view comprising the second information; and
    based on detecting, via the touchscreen display, input of a third type for the first message, different from the first and second types,
        identifying, by the computing device, third information associated with the first message; and
        sliding, into the viewable area of the touchscreen display, a second one of the panels comprising the third information.

9. A computing device, comprising:
    a touchscreen display;
    memory for storing program instructions; and
    a computer processor, wherein the computer processor is configured to execute the program instructions to at least:

control display, on the touchscreen display, of one or more panels separately slidable from a viewable area of the touchscreen display to outside the viewable area of the touchscreen display, a first one of the panels including a list of messages;

based on detecting, via the touchscreen display, input of a first type for a first one of the messages, control display, on the touchscreen display, of a modal window which is animated to originate at a location of the first message in the list of messages and comprises first information associated with the message;

based on detecting, via the touchscreen display, input of a second type for the first message, different from the first type, displaying on the touchscreen display, a pull-down view comprising second information associated with the first message; and based on detecting, via the touchscreen display, input of a third type for the first message, different from the first and second types, sliding, into the viewable area of the touchscreen display, a second one of the panels comprising third information associated with the first message.

10. The computing device of claim 9, wherein the input of the first type comprises an outward pinch gesture.

11. The computing device of claim 9, wherein the list of messages is partially overlapped by the modal window.

12. The computing device of claim 1, wherein the input of the first type comprises a pinch gesture.

13. The computing device of claim 9, wherein the input of the second type comprises a drag gesture.

14. The computing device of claim 9, wherein the input of the third type comprises a touch input to the first message.

15. The computing device of claim 9, wherein the second information comprises a message thread including the first message.

16. A non-transitory computer-readable storage medium comprising a plurality of instructions for displaying content, the plurality of instructions, when executed by at least one computer processor of a computing device, enables the at least one computer processor to at least:

control display, on a touchscreen display of the computing device, of one or more panels separately slidable from a viewable area of the touchscreen display to outside the viewable area of the touchscreen display, a first one of the panels including a list of messages;

based on detecting, via the touchscreen display, input of a first type for a first one of the messages, display, on the touchscreen display, control display of a modal window which is animated to originate at a location of the first message in the list of messages and comprises first information associated with the first message;

based on detecting, via the touchscreen display, input of a second type for the first message, different from the first type, displaying on the touchscreen display, a pull-down view comprising second information associated with the first message; and based on detecting, via the touchscreen display, input of a third type for the first message, different from the first and second types, sliding, into the viewable area of the touchscreen display, a second one of the panels comprising third information associated with the first message.

17. The non-transitory computer-readable storage medium of claim 16, wherein the input of the first type comprises an outward pinch gesture.

18. The non-transitory computer-readable storage medium of claim 16, wherein the list of messages is partially overlapped by the modal window.

19. The non-transitory computer-readable storage medium of claim 16, wherein the plurality of instructions, when executed, enable the at least one computer processor to:

control display of an animation of the modal window originating at a location of the first message and expanding therefrom.

20. A computing device comprising:

a touchscreen display;

one or more processors; and memory for storing program instructions for a messaging application, wherein the one or more computer processors configured to execute the program instructions for the messaging application to:

control display, on the touchscreen display, of one or more panels separately slidable from a viewable area of the touchscreen display to outside the viewable area of the touchscreen display, a first one of the panels including a list of messages;

based on detecting, via the touchscreen display, input of a first type for a first one of the messages, control blanking out of the first message in the list of messages and display of a modal window which is animated to originate at a location of the first message in the list of messages and to at least partly overlay the list of messages, the window comprising first information associated with the first message;

based on detecting, via the touchscreen display, input of a second type for the first message, different from the first type, displaying on the touchscreen display, a pull-down view comprising second information associated with the first message; and based on detecting, via the touchscreen display, input of a third type for the first message, different from the first and second types, sliding, into the viewable area of the touchscreen display, a second one of the panels comprising third information associated with the first message.

* * * * *